US006889626B2

(12) United States Patent
Furuya et al.

(10) Patent No.: US 6,889,626 B2
(45) Date of Patent: May 10, 2005

(54) METER FOR MOTOR VEHICLE

(75) Inventors: Yoshiyuki Furuya, Shizuoka (JP); Tetsuya Sugiyama, Shizuoka (JP)

(73) Assignee: Yazaki Corporation, Tokyo (JP)

(*) Notice: Subject to any disclaimer, the term of this patent is extended or adjusted under 35 U.S.C. 154(b) by 66 days.

(21) Appl. No.: 10/299,856

(22) Filed: Nov. 20, 2002

(65) Prior Publication Data

US 2003/0145649 A1 Aug. 7, 2003

(30) Foreign Application Priority Data

Feb. 4, 2002 (JP) ....................................... 2002-026948

(51) Int. Cl.[7] ................................................ G01D 11/24

(52) U.S. Cl. ....................... 116/305; 116/62.1; 116/284

(58) Field of Search ................................ 116/305, 62.1, 116/62.4, 284, 28 R, 56, 57, 287, 288, 286, 304; 362/26, 29, 28

(56) References Cited

U.S. PATENT DOCUMENTS

| | | | | |
|---|---|---|---|---|
| 1,739,954 A | * 12/1929 | Du Pont | 362/23 |
| 2,287,605 A | * 6/1942 | Dickson et al. | 116/62.3 |
| 2,711,153 A | * 6/1955 | Wendt | 116/62.3 |
| 2,907,869 A | * 10/1959 | Vaccaro, Jr. et al. | 362/27 |
| 3,029,334 A | * 4/1962 | Anderson et al. | 362/31 |
| 3,357,394 A | * 12/1967 | Ingham et al. | 116/305 |
| 5,161,480 A | 11/1992 | Furuya et al. | 116/62.1 |
| 5,284,108 A | * 2/1994 | Furuya | 116/286 |
| 5,302,964 A | 4/1994 | Lewins | |
| 5,353,735 A | * 10/1994 | Arai et al. | 116/286 |
| 5,353,736 A | * 10/1994 | Sasaki et al. | 116/304 |
| 5,915,822 A | * 6/1999 | Ogura et al. | 362/26 |
| 6,648,505 B1 | * 11/2003 | Chen | 116/305 |

FOREIGN PATENT DOCUMENTS

| | | | |
|---|---|---|---|
| DE | 41 29 975 A1 | 3/1993 | |
| GB | 2156292 A | * 10/1985 | B60K/35/00 |
| JP | 5-41940 | 6/1993 | |
| JP | 11-85072 | 3/1999 | |
| JP | 2602760 | 11/1999 | |
| JP | 2001-315548 | 11/2001 | |
| WO | WO 89/02611 A1 | 3/1989 | |

OTHER PUBLICATIONS

Copy of British Patent Office Communication for corresponding British Patent Application GB 0226914.0 including British Search Report dated May 13, 2003.

* cited by examiner

*Primary Examiner*—Christopher W. Fulton
*Assistant Examiner*—Amy R. Cohen
(74) *Attorney, Agent, or Firm*—Armstrong, Kratz, Quintos, Hanson & Brooks, LLP

(57) ABSTRACT

A meter for a motor vehicle includes a meter case 4 for protecting components of the meter which are incorporated therein, and a front cover 9 composed of a prism which is a part of a convex lens and provided in front of the meter case 4. A dial plate 5 of the meter has an outer contour in a substantially elliptical shape so that a virtual image of the dial plate as seen through the front cover 9 may look like a substantially perfect circle. Since the virtual image of the dial plate 5 is expanded in a vertical direction due to magnification inherent in the prism 9, the dial plate 5 formed in a substantially elliptical shape will be deformed into a substantially perfect circle in sight.

2 Claims, 2 Drawing Sheets

METER FOR MOTOR VEHICLE

BACKGROUND OF THE INTENTION

1. Field of the Invention

The present invention relates to a meter for a motor vehicle of a type having a front cover which is provided in front of a meter case for protecting an interior of the meter.

2. Description of the Related Art

Heretofore, there has been such a meter for a motor vehicle which is installed on an instrument panel with its display face opposed to a driver's seat. The meter for the vehicle of this type has been hoodless in view of a space for installation, and has been generally provided with a front cover for protecting the interior (See Japanese Utility Model Registration No. 2602760, for example)

FIG. 4 is a schematic sectional view of the above described conventional meter for the vehicle which is installed on the instrument panel.

In FIG. 4, a meter 3 for a vehicle is arranged on an instrument panel 1 underneath a wind shield 2, and includes a meter case 4 having substantially C-shape in cross section, in which there are incorporated a dial plate 5, an indicator 8, and a movement 6 for actuating the indicator 8. A prism 9 composed of a prism formed of resin, glass or the like is fitted to an open face of the meter case 4 as a front cover. An apex of the prism 9 is directed upward.

A back face 9*a* of the prism 9 which is faced with the dial plate 5 of the meter 3 is inclined from a vertex P embracing a vertical angle θ so as to approach a lower end of the dial plate 5, while a front face 9*b* of the prism 9 is substantially in parallel to a front face of the dial plate 5. Other faces of the prism 9 than the front face 9*b* and the back face 9*a*, that is, a bottom face 9*c* and side faces 9*d* are painted in dark color.

The meter for the motor vehicle constructed as described above has been advantageous in that it has less surface reflection of daylight, and can be free from reflection on a window at night, as disclosed, for example, in Japanese Utility Model Registration No. 2602760.

The prism 9 to be employed as the front cover may be in various shapes, for example, triangular in section as shown in FIG. 5A, triangular only in its middle part while in a shape of a flat plate in its upper and lower parts as shown in FIG. 5B, in a shape of a convex lens having magnification with its end portion cut away as shown in FIG. 5C, and so on.

However, in case where the prism 9 having such a shape as indicated in FIG. 5C, there has been a problem that when the dial plate 5 in a shape of a perfect circle is seen through the prism 9 as shown in FIG. 6, the dial plate 5 in a shape of a perfect circle (shown by a dotted line) is vertically expanded due to the magnification inherent in the prism 9, and looks deformed as a virtual image 5A in a shape of a vertically elongated ellipse (shown by a solid line) as shown in FIG. 7. Therefore, the driver may have uneasy feeling.

In view of the above described problem of the prior art, an object of the present invention is to provide a meter for a motor vehicle in which uneasy feeling due to distortion of a virtual image of a dial plate can be eliminated.

SUMMARY OF THE INVENTION

In order to attain the above described object, according to a first aspect of the present invention, there is provided a meter for a motor vehicle comprising a meter case for protecting a dial plate, an indicator and a movement for actuating the indicator which are incorporated therein, and a front cover composed of a prism which is a part of a convex lens and provided in front of the meter case, wherein the dial plate has an outer contour in a substantially elliptical shape so that a virtual image of the dial plate as seen through the front cover may look like a substantially perfect circle.

According to the first aspect of the present invention, because the dial plate has the outer contour in a substantially elliptical shape so that the virtual image of the dial plate as seen through the front cover may look like a substantially perfect circle, uneasy feeling caused by the distorted virtual image of the dial plate as seen through the front cover can be eliminated.

According to a second aspect of the present invention, there is provided a meter for a motor vehicle comprising a meter case for protecting a dial plate, an indicator and a movement for actuating the indicator which are incorporated therein, and a front cover composed of a prism which is a part of a convex lens and provided in front of the meter case, wherein the dial plate is provided with an outline in a substantially elliptical shape encircling a dial on the dial plate so that a virtual image of the outline as seen through the front cover may look like a substantially perfect circle.

According to the second aspect of the present invention, because the dial plate is provided with the outline in a substantially elliptical shape encircling the dial on the dial plate so that the virtual image of the outline as seen through the front cover may look like a substantially perfect circle, uneasy feeling caused by the distorted virtual image of the outline on the dial plate as seen through the front cover can be eliminated.

DESCRIPTION OF THE PREFERRED EMBODIMENT

Figure 1:
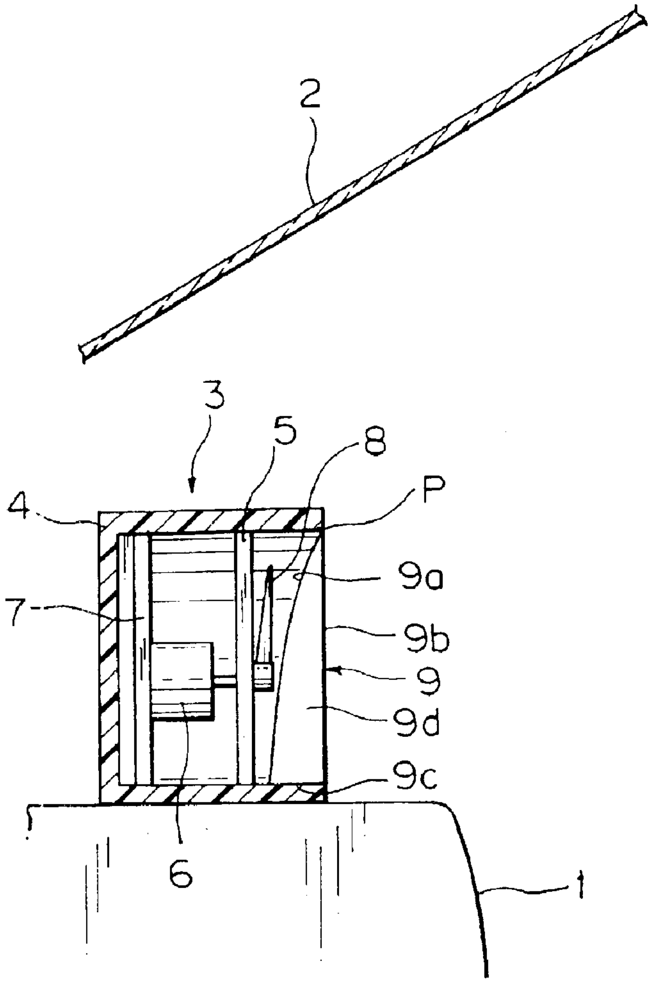
FIG. 1 is a schematic sectional view of an embodiment of a meter for a motor vehicle according to the present invention, in a state where the meter is installed on an instrument panel.

Now, referring to the drawings, an embodiment of the present invention will be described. FIG. 1 is a schematic sectional view of an embodiment of a meter for a motor vehicle according to the present invention in a state where the meter is installed on an instrument panel.

In FIG. 1, a meter 3 for a motor vehicle is installed on an instrument panel 1 which is arranged underneath a wind shield 2 in front of a driver's seat. The meter 3 includes a meter case 4 in a substantially C-shape in cross section, and a dial plate 5 is incorporated into the meter case 4. There is set an indicator 8 on a front face of the dial plate 5, in such a manner that the indicator 8 is fixed to an indicator shaft which is extended through a hole formed in the dial plate 5. This indicator shaft is extended from a movement 6 which is attached to a circuit board 7 provided in the rear of the dial plate 5. When a signal is inputted into the movement 6, the indicator shaft is rotated so that the indicator 8 can point a dial on the dial plate 5 which is composed of characters, signs, etc., in correspondence with the signal.

Figure 5A:
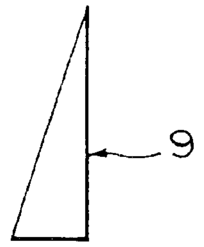
PRIOR ART FIG. 5A
FIG. 5A is a schematic view showing an example of a shape of a prism to be employed as a front cover in the meter for the motor vehicle of FIG. 4.
Figure 5B:
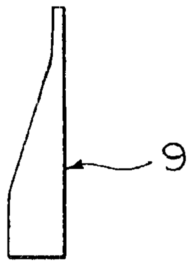
PRIOR ART FIG. 5B
FIG. 5B is a schematic view showing another example of the shape of the prism to be employed as the front cover in the meter for the motor vehicle of FIG. 4.
Figure 5C:
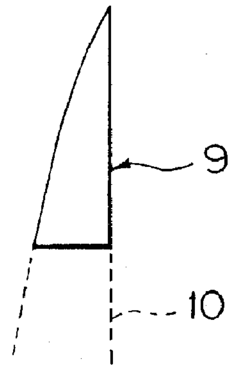
PRIOR ART FIG. 5C
FIG. 5C is a schematic view showing still another example of the shape of the prism to be employed as the front cover in the meter for the motor vehicle of FIG. 4.
Figure 3:
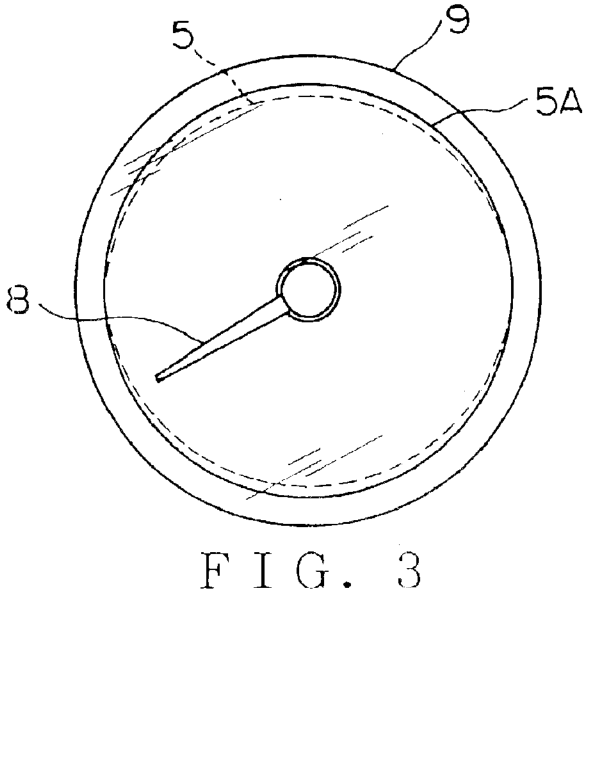
FIG. 3 is a schematic view for explaining a virtual image of the dial plate in the meter for the motor vehicle of FIG. 1 as seen through a front cover.
Figure 4:
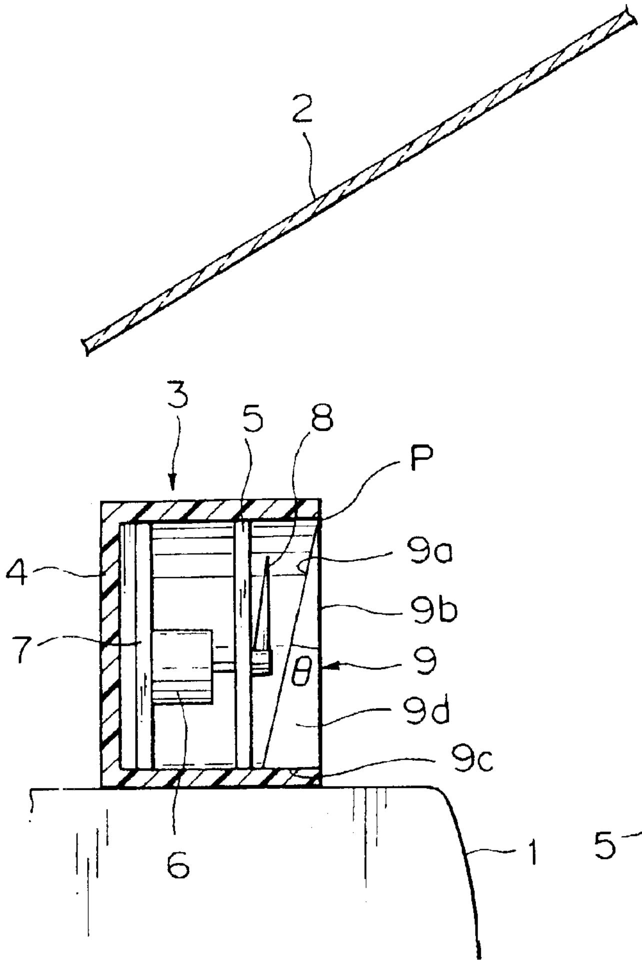
PRIOR ART FIG. 4
FIG. 4 is a schematic sectional view of a conventional meter for a motor vehicle, in a state where the meter is installed on an instrument panel.
Figure 6:
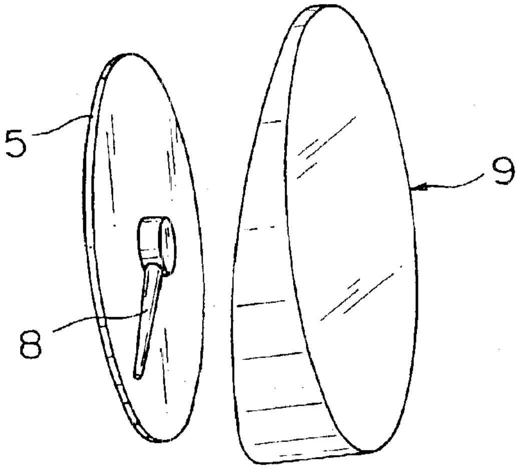
PRIOR ART FIG. 6
FIG. 6 is an exploded perspective view showing the dial plate and the prism in the meter for the motor vehicle of FIG. 4.

In addition, a prism 9 formed of resin, glass or the like is fitted to an open face of the meter case 4 as a front cover. This prism 9 has a shape of a convex lens having magnification, whose end portion is cut away as shown in FIG. 5C and FIG. 6. An apex of the prism 9 is directed upward.

A back face 9*a* of the prism 9 faced with the dial plate 5 of the meter 3 is curved from a vertex P of the prism 9 so as to approach a lower end of the dial plate 5, while a front face 9*b* of the prism 9 is substantially in parallel to a front face of the dial plate 5. Other faces of the prism 9 than the front face 9*b* and the back face 9*a*, that is, a bottom face 9*c* and side faces 9*d* are painted in dark color.

Figure 2:
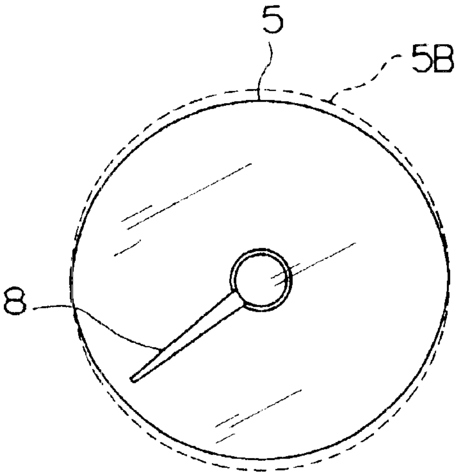
FIG. 2 is a schematic front view of a dial plate in the meter for the motor vehicle of FIG. 1.
Figure 7:
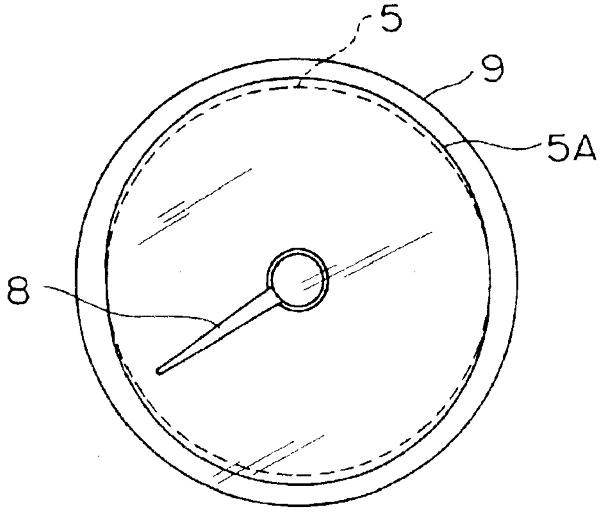
PRIOR ART FIG. 7
FIG. 7 is a schematic view for explaining a virtual image of the dial plate in the meter for the motor vehicle of FIG. 4, as seen through the front cover.

As shown in FIG. 2, the dial plate 5 is substantially formed in a shape of a laterally elongated ellipse which is collapsed from a perfect circle 5B in a vertical direction. A degree of the vertical collapse from the perfect circle 5B is determined to be substantially equal to a degree of the vertical expansion of the dial plate due to the magnification inherent in the prism 9, which has been described referring to FIG. 7.

By constructing the meter in this manner, when the dial plate 5 substantially formed in a shape of a laterally elongated ellipse which is collapsed from the perfect circle 5B in a vertical direction is seen through the prism 9, the dial plate 5 (shown by a dotted line) is vertically expanded and distorted to make a virtual image 5A (shown by a solid line). As the results, the dial plate 5 which has been formed in the substantially elliptical shape will be deformed into a perfect circle in sight.

Accordingly, in the meter 3 for the motor vehicle provided with the prism 9 as the front cover of the meter case 4, uneasy feeling caused by the distorted virtual image of the dial plate 5 as seen through the prism 9 can be eliminated.

Although the present invention has been described referring to the embodiment, it is obvious that the present invention is not limited to this embodiment, but various modifications and applications of the invention can be made.

For example, in the above described embodiment, the dial plate 5 is formed in a substantially elliptical shape so that the distortion of the virtual image through the prism 9 may be compensated and the virtual image may look like a perfect circle. However, alternatively, the dial plate 5 may be provided with an outline encircling the dial, and this outline may be drawn in a substantially elliptical shape similarly to the above described embodiment. With this structure, this outline can be seen as a virtual image of a substantially perfect circle, when it is seen though the prism 9.

What is claimed is:

1. A meter for a motor vehicle comprising;

a meter case for protecting components of said meter which are incorporated therein, and a front cover composed of a prism which is a part of a convex lens and provided in front of said meter case, wherein a dial plate of said meter has an outer contour in a substantially elliptical shape and is so positioned in said meter case behind said front cover, said prism of the front cover having a back face that is curved and a front face substantially parallel to said dial plate, such that a virtual image of said dial plate as seen through said front cover appears as a substantially perfect circle.

2. A meter for a motor vehicle comprising;

a meter case for protecting components of said meter which are incorporated therein, and a front cover composed of a prism which is a part of a convex lens and provided in front or said meter case, wherein a dial plate of said meter is provided with an outline in a substantially elliptical shape encircling a dial on said dial plate and is so positioned in said meter case behind said front cover, said prism of the front cover having a back face that is curved and a front face substantially parallel to said dial plate, such that a virtual image of said outline as seen through said front cover appears as a substantially perfect circle.

* * * * *